United States Patent [19]

Howorth

[11] Patent Number: 5,074,899

[45] Date of Patent: Dec. 24, 1991

[54] METHOD FOR MANUFACTURING AN ANTI-VEILING-GLARE INPUT WINDOW FOR AN OPTICAL DEVICE

[75] Inventor: Jonathan R. Howorth, Maldon, Great Britain

[73] Assignee: B.V. Optische Industrie "de Oude Delft", Netherlands

[21] Appl. No.: 92,413

[22] Filed: Sep. 3, 1987

Related U.S. Application Data

[62] Division of Ser. No. 758,507, Jul. 24, 1985, Pat. No. 4,760,307.

[51] Int. Cl.$^5$ .................. C03B 29/00; H01J 40/18
[52] U.S. Cl. .................. 65/30.13; 65/31; 65/32.4; 65/111; 65/155; 313/534; 427/64; 427/74
[58] Field of Search .................. 65/30.1, 30.13, 31, 65/32, 42, 102, 111, 155; 427/64, 74; 313/534

[56] References Cited

U.S. PATENT DOCUMENTS

| | | | |
|---|---|---|---|
| 2,498,003 | 2/1950 | Peterson | 65/32 X |
| 2,649,387 | 8/1953 | Parsons et al. | 65/32 X |
| 3,902,880 | 9/1975 | Strack | 65/31 X |
| 3,997,312 | 12/1976 | Besselink | 65/30.13 |
| 4,065,283 | 12/1977 | Asohara et al. | 65/61 X |
| 4,475,059 | 10/1984 | Sink | 313/534 |
| 4,613,786 | 9/1986 | Holland et al. | 65/61 X |

Primary Examiner—Robert L. Lindsay
Attorney, Agent, or Firm—Louis E. Marn

[57] ABSTRACT

Anti-veiling-glare glass input window for an optical device. The window has throughout a shallow surface layer over its peripheral surfaces radiation absorbent free-metal-induced color centers. A method for preparation of such a window, which is particularly suited to be used as an input window for an image intensifier, involves preshaping the window from a clear glass and forming color centers in a shallow surface layer over at least the peripheral surfaces of the window. If the clear glass contains reduceable metal oxides the color centers are formed by subjecting at least the peripheral surfaces of the clear glass to a reducing atmosphere at a temperature high enough to cause the reducing atmospheres reducing component to diffuse into a shallow surface layer of the window and to reduce the metal oxides to free metal atoms.

1 Claim, 3 Drawing Sheets

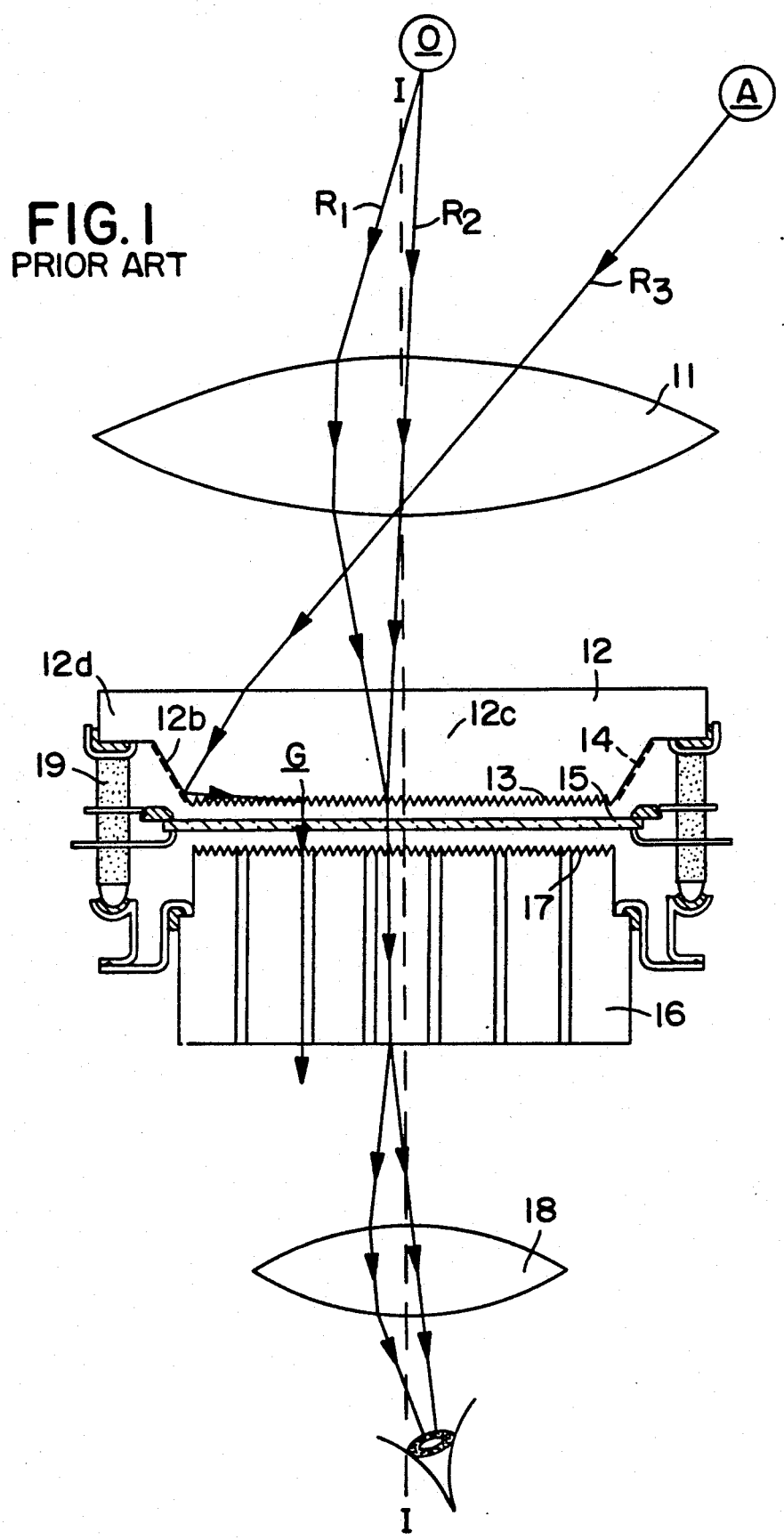

METHOD FOR MANUFACTURING AN ANTI-VEILING-GLARE INPUT WINDOW FOR AN OPTICAL DEVICE

This application is a division of Ser. No. 06/758507 filed Jul. 24, 1985, now U.S. Pat. No. 4,760,307, granted Jul. 26, 1985.

BACKGROUND OF THE INVENTION

1. Field of the Invention

The present invention relates to an anti-veiling-glare glass input window for an optical device, in particular suitable to be used as an input window for an image intensifier, and to a method of manufacturing such a window.

2. Detailed Description of the Prior Art

The term "image intensifier" is commonly used in the Art to describe a device for providing a bright picture of a dimly-lit scene. The device gathers radiation— which may be visible light or, perhaps, Infra-Red (IR) radiation—from the scene, and by means usually involving the conversion of the formed radiation image into an equivalent electron image, the electrical amplification of this latter, and the subsequent re-conversion of the amplified electron image into a visible-light image, it provides a much brighter view of the scene than could possibly be obtained by the naked eye.

Over the past twenty years or so the mode of construction and operation of image intensifiers has changed resulting in smaller, more efficient devices. In the earliest intensifiers—what are now called the first generation devices—the incoming radiation was imaged via a fibre-optic faceplate onto a photocathode layer (carried by the other side of the plate), and the streams of generated electrons were accelerated (via the intensifier section) through an electron-focussing field onto a photoanode—a phosphor, or luminescent, screen converting incident electrons to visible light. At a later date, the so-called second-generation intensifiers was developed, in which instead of the extremely complicated and bulky fibre-optic faceplate and electron-optic intensifier sections there was used a simple glass input window (again carrying the photocathode layer) together with what is now known as a "microchannel plate" in which, essentially, the generated electrons riccochet along the individual tubes (the channels) of a bundle of tubes, each tube-wall-contact generating a cascade of electrons so that each single electron at the input of a tube results in many electrons at the output of the tube, the output electrons being directed to a photoanode/luminescent screen to provide the required bright visible-light image. Presently, much work is being done on third-generation devices, which are very similar to the second-generation microchannel plate devices save that they employ thin semiconductor films on a glass cathode window; typical cathode material for the third generation devices are gallium-arsenide, aluminum gallium arsenide and indium gallium arsenide.

Both second- and third-generation intensifiers employ microchannel plates positioned adjacent one side of some electron-generations section (cathode), and on the other side—the input side—of the latter they include a plain glass input window through which the radiation from the viewed scene enters the intensifier. This window conventionally seals the intensifiers internal parts away from the ambient environment, and the inner surface adjacent the electron-generations section is usually employed to support a conductive layer constitutions the electrical connection to that section. Unfortunately, because of the physical shape of the most common types of input window, the conductive layer can cause severe problems arising from the internal reflection at the window/conductive layer boundary of off-axis light into the intensifier proper, so resulting in spurious image formation.

An intensifier input window is generally shaped so as in cross-section to have the shape of what can best be described as a very fat and very short T. The main body of the window is the upright of the T, and it has a circumferential radial flange at one face (the outer face, on the input side) to form the crossbar of the T. Finally, the inner face edge (defined by the bottom corners of the T upright) is bevelled (at about 45 degrees), the bevel extending all the way to the flange.

As mentioned above, the window is employed to support a connecting conductive layer, usually in the form of a vapour-deposited metal. The conductive layer is generally disposed on the bevelled surface and on the adjacent lower surface of the flange. It will be clear that, depending on its precise angle of incidence, light entering the window at an angle to the normal—i.e. from a source off the axis of the intensifier—may well be reflected at the window/conductive layer interface, and continue on into the intensifier to generate a spurious, or ghost, image.

Ghost images from off-axis sources can be very disturbing to the user of the intensifier, and various methods have been tried to eliminate them, or at least to reduce them to an acceptable level. One such method involves the use of input windows of the type known as "bullseye" or "saturn" windows, in which the central portion of the window (the core of the T upright) is made of clear glass, but the rest—the flange (the T crossbar) and the part adjacent the bevelled surface (the outer portion of the T upright)—is made of a dark (usually black) light-absorbent glass. Such a cathode window has been disclosed in U.S. Pat. No. 4,406,973.

A drawback of the known window is, that there still may occur unwanted reflections at the dark glass/clear glass interface resulting in spurious images. Also the known window is difficult to manufacture and hence rather expensive. According to U.S. Pat. No. 4,406,973 the known window is manufactured by taking a mass of clear glass and forming an annular channel in the mass of clear glass. The annular channel is filled with fluid black glass and the resulting disc of clear and black glass is machined to obtain a T-shaped window having a circumferential portion of black glass enclosing a cylindrical core of clear glass.

Another method of manufacturing the known window would be to heat-shrink an appropriate diameter tube of dark glass onto an appropriate diameter rod of clear glass, sawing the obtained rod into a number of discs each having the general dimensions of the required windows, and then shaping the circumferential surface of each disc by machining away the excess dark glass.

In both methods considerable difficulty can be experienced in properly centering the disc ready for the machining stage and frequently glass is removed excentrically, so exposing near the smallest diameter section of the bevelled part the clear glass core, thus leaving part of the resulting window unshielded by black glass. As in a later stage the bevelled surface to the input window will be covered with a metallic conductive layer this will result in unwanted reflections.

Also in both methods there is a high possibility of mechanical fracture and of bubble formation at the black glass/clear glass interface.

Further it is known from PCT patent application WO 84/04821 to manufacture an input window rejecting off-axis radiation by taking a cylindrical core of clear glass and cladding the cylindrical surface of the core with a special kind of glass containing thin fibers or leaves of radiation absorbing glass. The cladding glass is first made as a flat sheet, from which bevelled strips are cut. The bevelled strips are then arranged on the cylindrical surface of the core and fused together.

This known method is rather complicated and hence expensive. Also there will still occur some reflection on the cladding glass/core interface and there is a high possibility of mechanical fracture and bubble formation at the cladding glass/core interface.

SUMMARY OF THE INVENTION

The present invention proposes an anti-veiling glare glass input window that is very much easier, and cheaper, to manufacture, and yet is at least as effective or better, as well as a method for manufacturing such window.

In one aspect, therefore, this invention provides an anti-veiling glare glass input window for use an image intensifier tube which window comprises a clear glass faceplate having, throughout a shallow surface layer over its peripheral surfaces, radiation-absorbent, free-metal-induced, "colour centres".

BRIEF DESCRIPTION OF THE DRAWING

In a second aspect, the invention provides a method for the preparation of an anti-veiling glare input window according to the present invention, in which method in a thin layer at at least the peripheral surfaces of a pre-shaped clear glass window colour centres are formed.

The invention will now be described, though only by way of example, with reference to the accompanying drawings in which:

FIG. 1 is a diagrammatic cross-section of a Prior Art third generation image intensifier, showing the principles of its construction and the problems caused by off-axis radiation sources;

DETAILED DESCRIPTION OF THE INVENTION

Figure 2A:
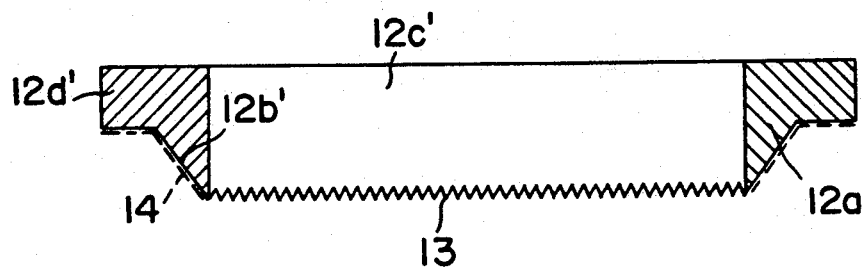
FIGS. 2A, B show respectively a diagrammatic cross-section of a Prior Art "bullseye" input window, and a part of this, enlarged to show some possible faults in it.

A typical Prior Art image intensifier device is illustrated in FIG. 1. The device comprises, arranged along an optical axis I—I, an objective lens 11, a T-shaped clear glass intensifier input window 12, a photocathode 13 carried by the central area of the inner surface of the window 12 and connected to an electrical source (not shown) by a conductive metal layer 14 carried by the peripheral area of the inner surface of the window 12, a microchannel plate 15, and a fibre optic exit window 16 carrying a phosphor screen 17 and leading to an eyepiece lens 18. The spacing of the input window 12 (and hence the photocathode 13), the microchannel plate 15, and the output window 16 (and hence the photoanode phosphor/luminescent screen 17) is maintained for instance by a sealingly bonded insulating ceramic tube 19.

It will be observed that the input window is shaped in section like a short, fat "T". It has a central portion 12c corresponding to the T upright, and a flange portion 12d, and the bottom (as viewed) corner/edge of the T upright is bevelled (as indicated at 12b) so that a conical surface extending from the photocathode 13 to the flange 12d is obtained, the smallest diameter part of the conical surface being located at the photocathode.

The paths of two rays of light R1, R2 from a near-axis object O are shown in this Figure. There is also shown the path of a ray of light R3 from a far off-axis source A, and how it can be reflected off the metal layer 14 to produce on the photocathode 13 a ghost image G of the object. This is objectionable to the user, for the ghost image is amplified by the intensifier just as is the proper image, and in any case is generally out of focus because of the unplanned optical path R3.

For some years the "bullseye" or "saturn" image intensifier faceplate designed in order to prevent the formation of such ghost images by internal reflection in the faceplate has been commercially available. It is described in U.S. Pat. No. 4,406,973, and is illustrated in cross-sectional view in FIG. 2. In this type of window, a cylindrical central portion 12c'—the core of the T upright—is clear glass, while the peripheral portion including the flange 12d' and a volume 12a adjacent the bevelled edge 12b' is black glass.

As stated before the known window is made by bonding in one way or another an annular black glass portion to a disc shaped clear glass portion and then machining the obtained product to the desired shape. In such a window a very sharply defined interface between the dark glass and the clear glass will be obtained, giving cause to spurious reflections as shown at 22 in FIG. 2B.

Figure 2B:
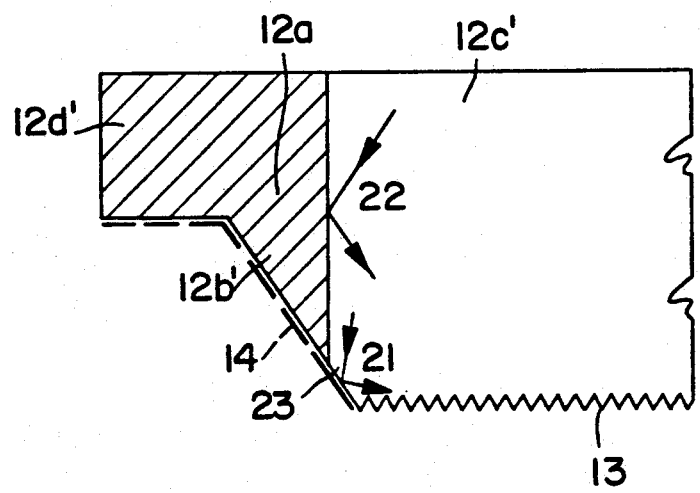

FIG. 2B also shows the effect of a slight eccentricity of the window during machining of the bevelled part 12b' resulting in an exposed bevelled clear glass surface as indicated at 23. This exposed bevelled surface 23 will give rise to spurious reflections as indicated at 21, especially after the bevelled surface of the window has been provided with the conductive coating 14.

Figure 3A:
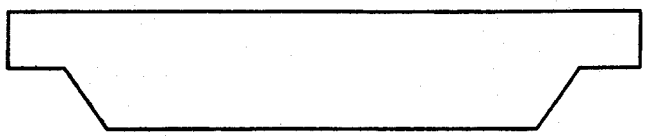
FIGS. 3A, B, C show a series of diagrammatic cross-sections of an inventive input window at various stages of its manufacture according to an example of a method according to the invention.
Figure 3B:
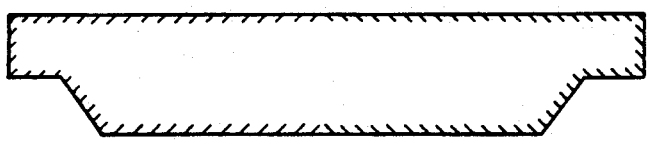
Figure 3C:
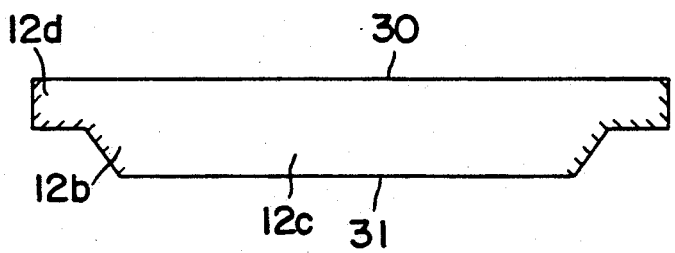

An embodiment of the input window of the invention is shown in FIG. 3c, FIGS. 3A and 3B showing stages in one method for its preparation. FIG. 3A shows a window in its final shape but still entirely of clear glass. The clear glass most commonly used for this type of image intensifier is Corning type 7056—boro-silicate glass which contains small quantities of oxides of rare earth metals and other metals. Another suitable glass is Sovirel 801.51.

These two kinds of glass are suited for a variety of reasons, including mechanical properties, their expansion coefficient, the optics of the device in which the window is to be used. They contain about 67% $SiO_2$, 19% $B_2O_3$ and smaller quantities of $Al_2O_3$, $K_2O_3$ together with traces of Na, Li, As, Co and other impurities at the parts-per-million level, such as oxides of lanthanum and zirconium. As will become clear hereinafter other kinds of glass in principle will also be suitable provided they contain a sufficient quantity of metal oxide or free metals.

According to a preferred method of the present invention the metal oxide in the glass is converted into color centres in a thin surface layer extending at least over the bevelled portion of the window.

This conversion of metal oxide into colour centres is brought about by reducing the metal oxides in the desired area of the clear glass window to free metal atoms. The free metal atoms form the colour centres and strongly absorb radiation especially visible light and infra-red light, and thus appear as a dark layer in the clear glass.

It is observed here that the formation of colour centres in alkalimetal halide crystals—such as NaCl, KCl and KBr—is well known (and is described in the standard solid state Physics textbooks such as A. J. Dekker, "Solid State Physics", Macmillan 1952). Colour centres are also known as "F-centres", and occur when the crystal lattice becomes non-stoichiometric—having an excess of the metal with respect to the halogen. The free metal atoms become sites for optical absorption at characteristics wavelengths. In metal halide crystals the colouring becomes apparent when the crystals are heated to around 600°–700° C.

Although the term "colour centre" as used herein in connection with the invention may not be strictly accurate for the processes which actually occur, it represents a reasonably good empirical explanation—and is to be regarded primarily in the light! It is believed that in the preferred process the action of the reducing agent reduces the metal oxides in the glass giving rise to a non-stoichiometry (excess metal-to oxide) which induces optical absorption in a manner similar to that better known for the halides. And since a glass (like Corning 7056) is a complex mixture of many metal oxides together with halides as minor impurities, many individual absorption wavelengths will be created on heating, giving rise to a general blackening.

It should be noted that the colour centres may in an alternative method be formed in the clear glass window by diffusing metal atoms into the glass for instance by ion implantation techniques known per se.

According to the preferred embodiment of the method of the present invention however the colour centres are formed by reduction of metal oxides as explained above.

Thus the clear glass window shown in FIG. 3A is brought into a reducing atmosphere, for instance a hydrogen atmosphere, and the reducing atmosphere is caused to diffuse into a surface layer of the glass. Though other reducing atmospheres are possible, hydrogen is preferred. It is relatively cheap and easy to handle, and because of its small molecular size diffuses sufficiently quick for a colour centre shallow layer of the required depth, for instance 0.5 mm or even less, to be formed in a reasonably short time. The diffusion is effected at a suitably high temperature. The particular temperature will, of course, depend upon the atmosphere, the available time, and other factors (such as the nature of the glass), but for hydrogen a generally satisfactory temperature is in the range 600° to 800° C., a preferred range for use with Corning type 7056 being from 620° to 700° C.

The diffused reducing atmosphere reduces most or all of the metal oxides in the shallow surface layer to free metal (some of this "free" metal may in fact be loosely associated with unreduced metal oxide, forming various suboxides; these are, in this context, and for the purpose of this Specification, included in the expression "free metal").

The speed of diffusion of the reducing atmosphere into the surface layers of the input window glass depends upon the temperature, upon the nature of the atmosphere, and upon the physical state of the surface. A smooth surface presents a uniform barrier, whereas a microscopically-rough,—pitted or even—fissured surface speeds up diffusion because the atmosphere can the more quickly reach the bottom of the pits or fissures, and thus the lower levels of the surface layers. Microscopic roughness of this type can be accentuated (though not necessarily to a degree unacceptable to the optics of the system) by mildly etching the surface, using either a strong alkali (typically an alkali-metal hydroxide such as sodium hydroxide) or a glass-dissolving acid (such as hydrofluoric acid). The etching action occurs preferentially at the various sites and regions where the glass surface was damaged during any earlier grinding process. For example, etching the glass in a 1% aqueous solution of HF for 1 minute will enhance the work damage in the surface of the glass so that it becomes visible under a 500 power microscope—that is to say, that tiny fissures of perhaps 0.001 mm width and depth will become apparent. The time required to produce a given degree of blackening at a given temperature will be considerably reduced by such an etch—a factor 5 reduction in time would not be uncommon—depending on the precise temperature, glass and so forth.

The action of the reducing agent could be confined solely to the surface areas to be blackened, thus resulting directly in a window as shown for instance in FIG. 3c. The window of FIG. 3c has blackened at the surface of the bevelled portion and at the lower and circumferential surfaces of the flange. The blackening has been indicated by shading. This may be done by coating the windows inner and outer major surface 30 and 31 resp. with a layer of protective material before carrying out the step of reducing the metal oxides to free metal atoms, and then, after the reducing step, removing the protective coating. As an alternative the window could be placed in a suitable holder sealing of the surfaces 30 and 31 from the reducing atmosphere.

However, according to a preferred embodiment of the inventive method the entire surface of the window will be subjected to the reducing atmosphere, so creating a radiation-absorbent, colour centre layer over this whole surface as shown in FIG. 3B, and then that layer be selectively removed from those areas—the inner and outer major faces—where it is not required in order to obtain a window as shown in FIG. 3C. This removal can be effected by simple and relatively straightforward plano-plano grinding/lapping techniques, and needs no further discussion.

Experimental cathode windows for an image intensifier have been made by first shaping a window of Corning 7056 glass, then etching the window over its entire surface in a 1% aqueous NaOH solution for one minute.

After the etching step the windows were heated in a hydrogen atmosphere at various temperatures in the 620°–700° C. range. Within 24–40 hours an adequate blackening by colour centre formation in a surface layer was obtained without mechanical deformation (creep) occurring in the glass. Thereafter the input and output faces of the windows were ground by a simple plano-plano process in order to remove the colour centre layer on these faces and to obtain the desired anti-veiling-glare windows.

It is observed, that the blackening obtained by the method of the invention is inherently concentric with the windows optical axis and that since the window is still in effect homogeneous there is no risk of mechanical failure.

The inventive anti-veiling glare window has so far been described as useable with image intensifying devices. It may, however, be of some value in other optical systems where it is necessary or desireable to suppress reflections of stray light from a peripheral area, one example being a television tube of the LEDDICON type. The invention is particularly applicable to third-generation image intensifiers of the type using a Corning 7056 glass (or similar glass) faceplate window together with a GaAs photocathode bonded to the faceplate at a temperature of around 650° C. Since the GaAs is the detector, it is especially convenient to be able to blacken the glass during or after the bonding stage so that the blackening is exactly centred with the detector.

Figure 4:
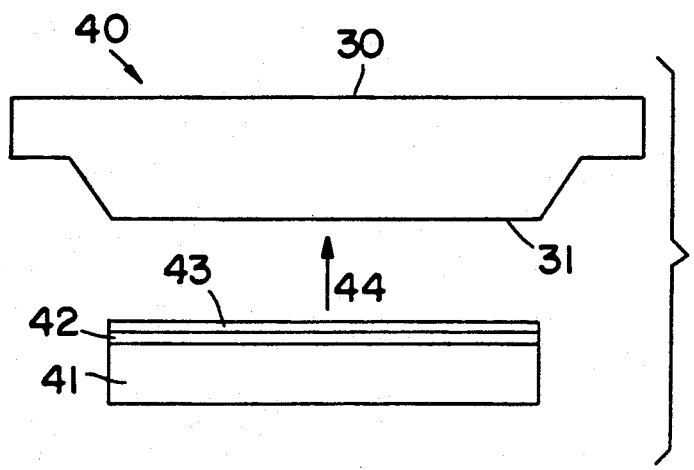
FIG. 4 illustrates a modification of a method according to the invention.

FIG. 4 shows schematically a T-shaped input window 40 for a third generation image intensifier. The window has as yet not been blackened but may have been etched as discussed above. Near the window 40 a disc shaped photocathode is shown, having the diameter as the inner face 31 (in the image intensifier to be manufactured) of the window, and comprising essentially a disc 41 of GaAs, covered at one major face with a known antireflection layer 42 of SiN, the antireflection layer being covered at the side facing away from the GaAs disc by a coating 43 of $SiO_2$. The disc-shaped photocathode is bounded to the inner face 31 of the window by pressing the photocathode with the $SiO_2$ surface against the inner face 31 of the window, as indicated by an arrow 44 and heating to a temperature of around 650° C. If now the heating is done in a hydrogen atmosphere the metal oxides near the free surfaces of the window will be reduced to free metal atoms and thus the blackening will occur during the step of bonding the photocathode to the window.

Of course the outer major surface 30 of the window should be protected from the hydrogen atmosphere, or the blackened layer should be removed afterwards.

I claim:

1. A method for the preparation of an anti-veiling glare glass input window for an image intensifier having a gallium containing photocathode bonded to one face of the input window, which comprises the steps of;
    a) preshaping an input window from clear glass containing quantities of metal oxides;
    b) reducing said metal oxides in a shallow surface layer of peripheral surfaces of said input window by subjecting said peripheral surfaces to a reducing atmosphere to obtain free metal atoms in said shallow surface layer, said free metal atoms constituting radiation adsorbent colour centres;
    c) pressing a preshaped photocathode layer against a major surface of said input window during step b); and
    d) heating said input window during steps b) and c) to a temperature between 620° C. and 700° C. to effect diffusion of a reducing agent into said shallow surface layer and bonding of said photocathode layer to said input window.

* * * * *